(12) United States Patent
Lagarrigue et al.

(10) Patent No.: US 12,291,302 B2
(45) Date of Patent: May 6, 2025

(54) INTERNAL DEVICE HAVING AN EXCENTRIC BEARING FOR A STEERING COLUMN

(71) Applicants: Jacques Lagarrigue, Allauch (FR); Thierry Navarro, Gland (CH)

(72) Inventors: Jacque Lagarrigue, Allauch (FR); Thierry Navarro, Gland (CH)

( * ) Notice: Subject to any disclaimer, the term of this patent is extended or adjusted under 35 U.S.C. 154(b) by 135 days.

(21) Appl. No.: 18/008,201

(22) PCT Filed: Jun. 15, 2021

(86) PCT No.: PCT/IB2021/055284
§ 371 (c)(1),
(2) Date: Dec. 5, 2022

(87) PCT Pub. No.: WO2021/255649
PCT Pub. Date: Dec. 23, 2021

(65) Prior Publication Data
US 2023/0278659 A1  Sep. 7, 2023

(30) Foreign Application Priority Data

Jun. 16, 2020  (WO) ................. PCT/IB2020/055601
Jun. 25, 2020  (WO) ................. PCT/IB2020/056012

(51) Int. Cl.
*F16C 23/10*  (2006.01)
*B62K 21/06*  (2006.01)

(52) U.S. Cl.
CPC .............. *B62K 21/06* (2013.01); *F16C 23/10* (2013.01); *F16C 2326/24* (2013.01)

(58) Field of Classification Search
CPC ...... F16C 23/10; F16C 23/043; F16C 23/045; F16C 23/08; F16C 23/082; F16C 23/084; F16C 23/086; F16C 23/088; F16C 2326/24; B62K 21/06
See application file for complete search history.

(56) References Cited

U.S. PATENT DOCUMENTS 7,360,963 B1 * 4/2008 Burns .................... B62K 21/06
403/177
8,292,316 B2 * 10/2012 Lin ........................ B62K 21/22
280/280

FOREIGN PATENT DOCUMENTS

| CN | 110273918 A | * | 9/2019 | ............. F16C 23/10 |
|---|---|---|---|---|
| DE | 102006024326 A1 | | 11/2007 | |
| DE | 102011086127 A1 | * | 5/2013 | ............. B62K 21/06 |
| DE | 102017119483 A1 | * | 2/2019 | ............. B62K 21/06 |
| FR | 890247 A | | 2/1944 | |
| JP | H1134888 A | * | 2/2009 | |

* cited by examiner

*Primary Examiner* — Phillip A Johnson
(74) *Attorney, Agent, or Firm* — Jose Cherson Weissbrot (57) ABSTRACT

The invention relates to an vehicle steering column internal device intended to facilitate driving in curves by modifying the alignment of the front and rear wheels of the vehicle, by a transverse/lateral shift, using an eccentric rolling bearing, holding a part of the steering column shaft.

17 Claims, 11 Drawing Sheets

CROSS-SECTION A-A

CROSS-SECTION B-B

FIG 11d

INTERNAL DEVICE HAVING AN EXCENTRIC BEARING FOR A STEERING COLUMN

TECHNICAL FIELD

The present invention relates to a vehicle steering column internal device intended to facilitate driving in curves by modifying the alignment of the front and rear wheels of the vehicle.

This system is in particular designed to adapt to any steering type and can be mounted on existing steering columns or integrated into the production of steering columns for new vehicles or other machines.

More particularly, the device according to the invention is configured as a replacement device for the rolling bearings (in French "roulements") of the mechanism inside conventional steering column, preferably without having to change the steering column shaft.

The device comprises an eccentric spherical (*in French "à rotule") rolling bearing preferably disposed on the upper part of the steering column shaft and a concentric spherical rolling bearing preferably provided on the lower part of the steering column shaft.

STATE OF THE ART

The internal mechanisms of vehicle steering columns are mainly produced using concentric rolling bearings so as to induce a perfectly coaxial rotation between the handlebar rotational movement and that of the wheel along the steering column shaft. The inclination angle or rake angle (in French "angle de chasse") of the steering column is also fixed.

However, there are several inventions described in U.S. Pat. No. 3,866,946A, EP1841640B1 intended to allow modifying the inclination angle or rake angle of the column by using two concentric rolling bearings provided in two decentered hoops (in French "frettes") or retaining members. These systems thus allow adjusting the longitudinal inclination angle or rake angle of the steering column based on of the eccentricity of the hoops or retaining members of the rolling bearings.

According to the invention U.S. Pat. No. 3,866,946A, the inclination of the steering column guiding axis (in French "axe de guidage") is achieved by two rolling bearing members, each comprising an eccentric opening opposed to the other one by 180°, which remain fixed in the longitudinal axis of the vehicle formed by the front and rear wheels.

According to the invention EP1841640B1, the inclination of the steering column guiding axis is achieved by adjustable members allowing adjusting the steering column rake angle in a predefined manner without having to disassemble the fastening and guiding members of the steering column shaft.

The transverse inclination of the steering column guiding axis remains however fixed or static for a set of hoops, installed retaining members or angle setting defined at the two ends of the steering column shaft.

According to these inventions, during straight line and curve driving, the guiding axis of the steering column remains aligned in the longitudinal plane of the front and rear wheels of the vehicle, it is therefore impossible to vary the transverse inclination angle dynamically guiding the column while driving in curves or bends.

The main problem encountered while driving is that in a curve, the front wheel of the vehicle pivots around the steering column shaft, which is in general not vertical. In the case of a two-wheeled vehicle, this forces the driver into having to tip the vehicle laterally so as to correctly lead the vehicle into the oblique trajectory according to the curve to be followed. This movement thus facilitates changing the vehicle direction, but the fixed angle of the steering column limits the possible vehicle inclination, which proves dangerous when the rider leans too much or over a sudden dodge because the front wheel grips onto the road and the driver loses control of the vehicle.

DISCLOSURE OF INVENTION

A main goal of the present invention is therefore to propose a steering column internal device making it possible to transversely displace, all or in part, the guiding axis of the steering column, preferably of the front wheel, simultaneously with the handlebar rotation, which overcomes the drawbacks of the prior art.

To this end, the present invention relates more particularly to a steering column internal device, of the aforementioned type, characterized in that the system comprises at least a part of the steering column shaft provided, in relation or preferably integral, eccentrically, and/or optionally obliquely, in a rotating guiding member such as a rolling bearing or bearing (in French "palier").

The present invention also relates to a spherical rolling bearing or bearing intended to be integrally fixed to the shaft of the steering column in an eccentric manner.

The present invention also relates to a concentric rolling bearing or bearing intended to be integrally fixed to the shaft of the steering column in an oblique manner.

Thanks to these features, the device makes it possible to dynamically change the transverse inclination angle of the steering column guiding axis or to shift it laterally upon rotating the steering column shaft without having to replace the steering column guiding members. It is designed in such a way that it can replace the existing rolling bearings on steering columns, thus allowing to benefit from its advantages without having to change the steering column.

The system is designed to be robust, interchangeable and possibly reversible in order to ensure safety and avoid any maintenance.

BRIEF DESCRIPTION OF THE DRAWINGS

The present invention will be better understood upon reading the description of the examples, given for illustrative purpose only and in no way limiting, with reference to the appended drawings in which:

FIG. 11b shows a view according to cross-section A-A in FIG. 11a;

EMBODIMENTS OF THE INVENTION

Figure 1:
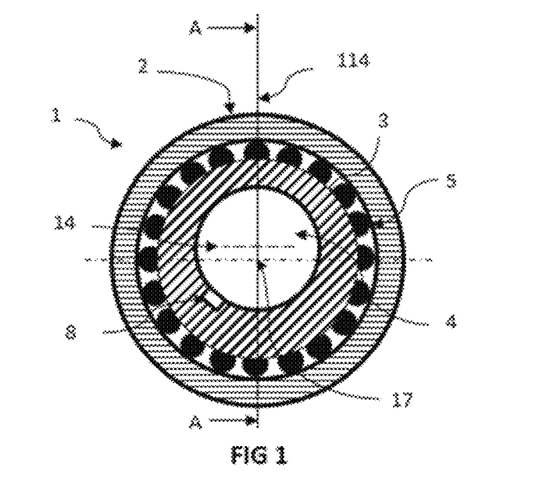
FIG. 1 is a top view of the eccentric spherical rolling bearing.

According to FIGS. 2, 1a, 1b, 1, 1a, the steering column internal device (2) according to a first embodiment, as illustrated in particular in FIG. 1, comprises an eccentric spherical member (9), preferably as a rolling bearing or a bearing, a concentric spherical member (10), preferably as a rolling bearing or a bearing, provided on a steering column shaft (20). The eccentric spherical member (1) preferably comprises an opening (4), provided eccentrically, in the inner ring (3), on the axis (14) with respect to the center (17) of the eccentric spherical member (1), in which the steering column shaft (10) is held integral.

Figure 2:
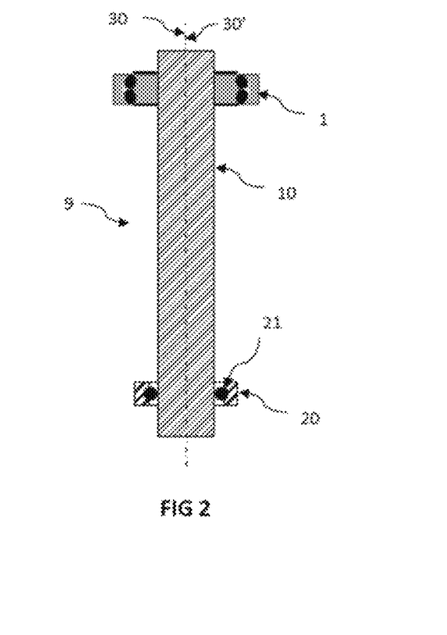
FIG. 2 shows a front sectional view of the steering column internal device in a straight position.

The members (1, 10, 20) of the steering column internal device (9) are provided in a hollow tube (not illustrated) generally named a steering column and which is normally part of the vehicle frame.

The fork tubes (not illustrated) are integrally fixed on the tube retaining supports (not illustrated), the latter being integrally fixed with the lower and upper part of the steering column shaft (10) according to a common implementation in the construction of two-wheeled vehicle steering columns.

Figure 1A:
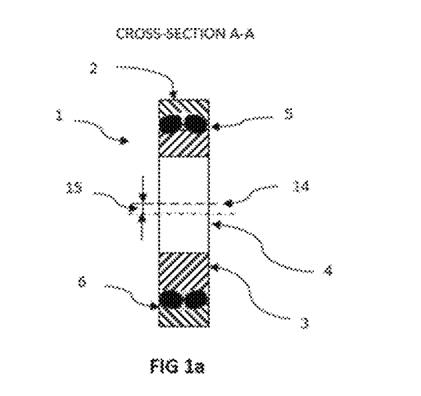
FIG. 1a shows a view according to cross-section A-A of FIG. 1.

The eccentric spherical member (1) preferably comprises rollers (5) provided around an inner ring (3) and held in position by an outer ring (2). The rollers (5) are solidly connected between and can freely pivot along the track (6) of the outer ring (2).

Figure 1B:
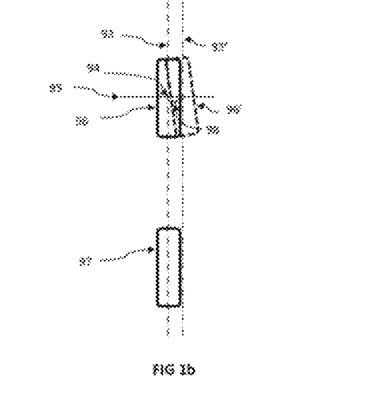
FIG. 1b shows a schematic top view of the alignment between the front and rear wheel of a vehicle.

According to FIG. 1b, the front wheel (96) is aligned with the rear wheel (97) along the longitudinal axis of the vehicle (93). In a normal configuration of a two-wheeled vehicle, pivoting the front wheel, by a rotation on the guiding axis of the steering column, occurs around the longitudinal axis of the vehicle (93) at the contact point (94) between the tire and the road.

According to FIGS. 1b, 2 and 1b, in the straight line driving position, the rotation axis (30') of the steering column shaft (10) is "coaxial" in the transversal plane (95) transverse to the vehicle longitudinal axis (93) with the common rotation axis (30) of the eccentric spherical member (1) and the concentric spherical member (20), corresponding to the normal steering column guiding axis. The steering column shaft (10) transversely pivots up to a maximum angle (ß), represented by the axes (30, 30') upon the rotation of the steering column shaft (10), formed by the eccentric displacement of the opening (4), preferably secured by a key (8) to the steering column shaft (10) and holding the steering column shaft (10) in the concentric spherical member (20).

Figure 2A:
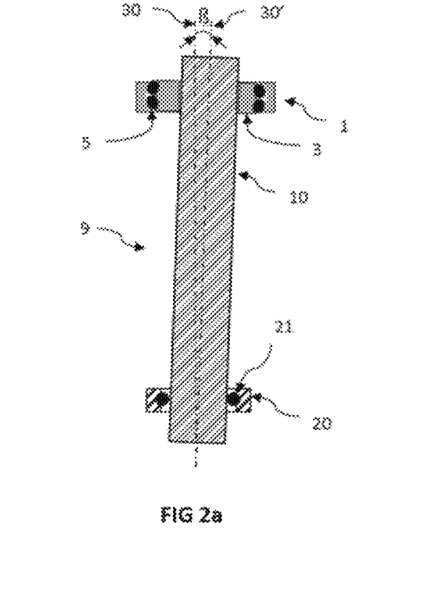
FIG. 2a shows a front sectional view of the steering column internal device in a rotation position.

The transverse angle change from 0 to (ß) thereby caused onto the steering column guiding axis, upon turning the vehicle handlebars, makes it possible to dynamically modify the front and rear wheel alignment (warping) according to the axis (93') while driving in curves, which makes the vehicle more manageable. The offset between the axes (93) and (93') generates a shift (98) of the rotating front wheel (96') on the road with the rear wheel (97) according to the angle from 0 to (ß) depending the length of the fork and the diameter of the wheels as well as the angle of rotation of the axis of the steering column (10). The shift (98) obtained thereby can be either on the side corresponding to the vehicle trajectory change or on the opposite side thereto, depending on whether the position of the opening (4) is provided eccentrically on one side or the other of the center (17) through which the rotation axis of the steering column shaft (10) normally passes, which is normally itself coaxial with the guiding axis of the steering column. Depending on the settings chosen upon designing the invention, the shift (98) resulting from offsetting the wheels on the ground is preferably between 0 and 20 mm. Driving is then improved in curves and safety increased over a dodge.

Invention Variations

According to another variation, not shown, the position of the concentric spherical member (20) on the steering column shaft (10) can be swapped with the eccentric spherical member (1).

Figure 8:
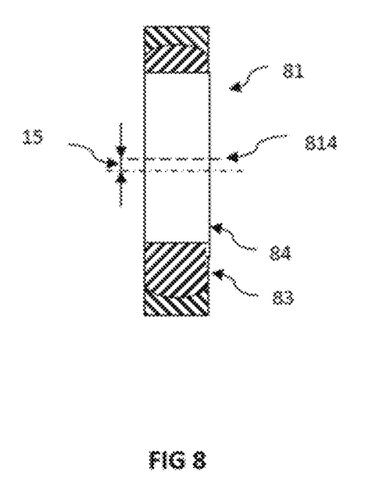
FIG. 8 shows a sectional view of an eccentric spherical bearing.

FIG. 8 illustrates a spherical bearing (81) with an eccentric opening (84) disposed in the inner ring (83) which can replace the eccentric spherical member (1).

Figure 3:
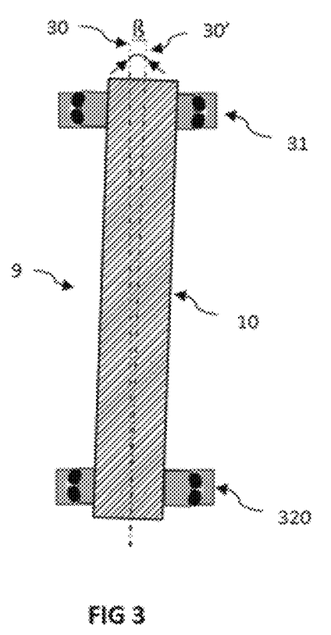
FIG. 3 shows a front sectional view of the steering column internal device in a rotation position of a second variation of the invention.

According to a second alternative of the invention, illustrated in FIG. 3, the steering column shaft (10) is secured and provided on the upper part thereof in an eccentric spherical member (31) and on its lower part in an eccentric spherical member (320) opposed at 180°. Upon rotating the steering column shaft (10), the two opposing eccentric movements pivot the steering column shaft (10) transversely, at most, by an angle (ß), represented by the axes (30, 30'), thus creating the shift (98) as previously described.

Figure 4:
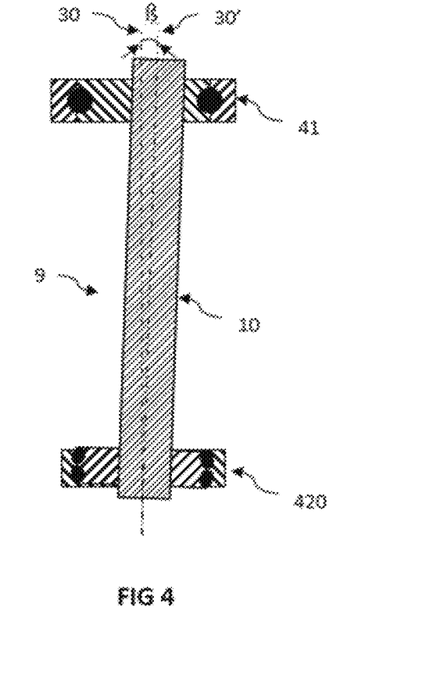
FIG. 4 shows a front sectional view of the steering column internal device in a rotation position of a third variation of the invention.

According to a third alternative of the invention, illustrated in FIG. 4, the steering column shaft (10) is secured and provided obliquely at its upper part in an eccentric rolling bearing member (41) and at its lower part in a concentric spherical member (420). Upon rotating the steering column shaft (10), the eccentric movement on the upper portion in the eccentric rolling bearing member member (41) pivots the steering column shaft (10) transversely, at most, by an angle (ß), represented by the axes (30, 30'), thus creating the shift (98) as previously described.

Figure 5:
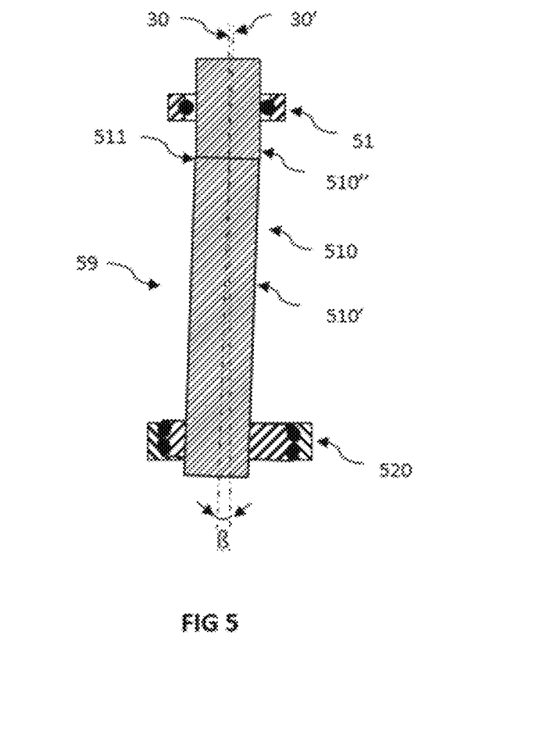
FIG. 5 shows a front sectional view of the steering column internal device in a rotation position of a fourth variation of the invention.

According to a fourth alternative of the invention, illustrated in FIG. 5, the steering column internal device (59) comprises a steering column shaft (510) formed by an oblique part (510') coaxial at the connection (511) with a second part (510"). The part of the steering column shaft (510") is provided in a concentric rolling bearing member (51) and its second part (510') is provided and fixed integrally in an eccentric spherical member (520). During the rotation of the axis of the steering column (510), the eccentric movement on the portion (510') follows the oblique line between the two portions (510', 510") of the steering column shaft (510) forming, at most, a transverse angle (ß), represented by the axes (30, 30'), thus creating the shift (98) as previously described.

Figure 6:
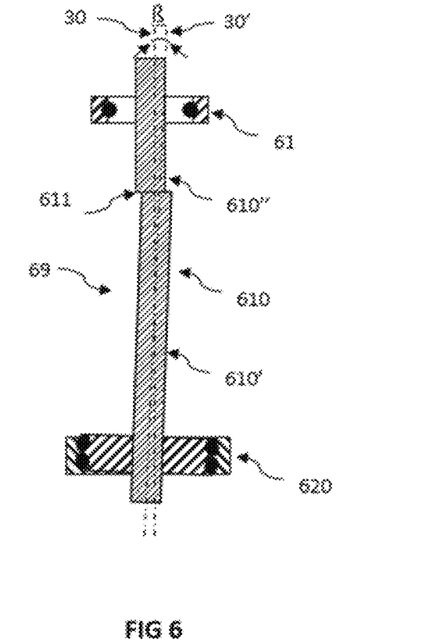
FIG. 6 shows a front sectional view of the steering column internal device in a rotation position of a fifth variation of the invention.

According to a fifth alternative of the invention, illustrated in FIG. 6, the steering column internal device (69) comprises a steering column shaft (610) formed by an oblique part (610') offset at the connection (611) with a second part (610"). The part of the steering column shaft (610") is provided in a concentric rolling bearing member (61) and its second part (610') is provided in a concentric spherical member (620). During the rotation of the axis of the steering column (610), the eccentric movement on the portion (610') follows the oblique line between the two portions (610', 610") of the steering column shaft (610) forming, at most, a transverse angle (ß), represented by the axes (30, 30'), thus creating the shift (98) as previously described.

Figure 7:
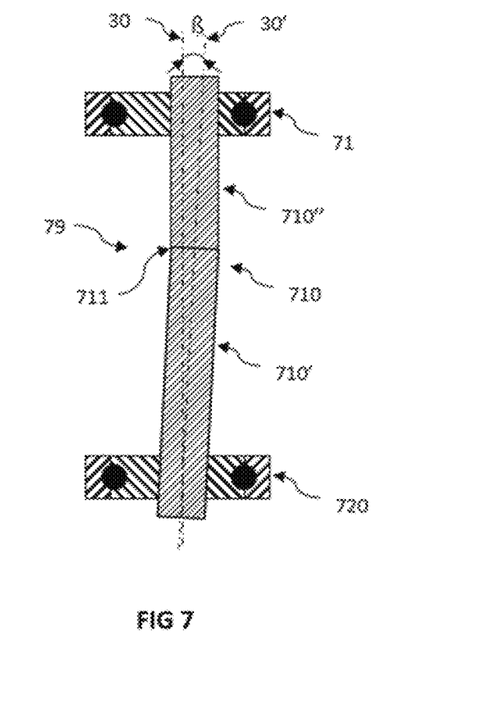
FIG. 7 shows a front sectional view of the steering column internal device in a rotation position of a sixth variation of the invention.

According to a sixth alternative of the invention, illustrated in FIG. 7, the steering column internal device (79) comprises a steering column shaft (710) formed by an oblique part (710') coaxial at the connection (711) with a second part (710"). The part of the steering column shaft (710") is provided in an eccentric rolling bearing member (71) and the second part (710') thereof provided in a rolling bearing member (720) obliquely. During the rotation of the axis of the steering column (710), the eccentric movement on the portion (710') follows the oblique line between the two portions (710', 710") of the steering column shaft (710) forming, at most, a transverse angle (ß), represented by the axes (30, 30'), thus creating the shift (98) as previously described.

Figure 9:
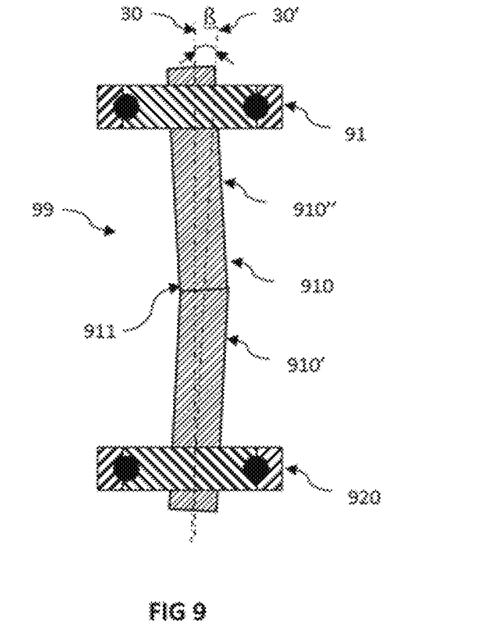
FIG. 9 shows a front sectional view of the steering column internal device in a rotation position of a seventh variation of the invention.

According to a seventh alternative of the invention, illustrated in FIG. 9, the steering column internal device (99) comprises a steering column shaft (910) formed by an oblique part (910') coaxial at the connection (911) with an oblique second part (910"). The part of the steering column shaft (910") is provided in a concentric rolling bearing member (91), obliquely, and its second part (910') is provided in a rolling bearing member (920), obliquely. Upon rotating the steering column shaft (910), the oblique movements on the portions (910', 910") of the steering column shaft (910) form, at most, a transverse angle (ß), represented by the axes (30, 30'), thus creating the shift (910) as previously described.

The connections (511, 611, 711, 911) can be made as a welded assembly, a machined assembly, a universal joint assembly or an assembly with any to suitable means.

Figure 10:
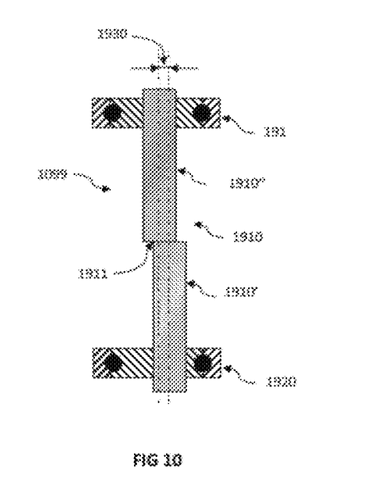
FIG. 10 shows a front sectional view of the steering column internal device in a rotation position of an eighth variation of the invention.

According to an eighth alternative of the invention, illustrated in FIG. 10, the steering column internal device (1099) comprises a steering column shaft (1910) formed by a part (1910') off-centered at the connection (1911) with a second part (1910"). The part of the steering column shaft (1910") is provided in a concentric rolling bearing member (191), and its lower second part (1910') provided in a rolling bearing member (920), in an eccentric manner and parallel to the part (1910"). Upon rotating the steering column shaft (1910), the shift between the portions (1910', 1910") of the steering column shaft (1910) displaces transversely/laterally, at most, up to the distance (1930), the guiding axis the steering column (1099) in a similar manner as in the previous alternatives of the invention. In this case, the shift (98) is equal to the distance (1930) because there is no pivoting of the guiding axis of the steering column but a direct transverse/lateral translation thereof. This proves particularly useful for providing a shift (98) independent of parameters such as fork length or wheel diameter. In this alternative, the rake angle is not affected by the invention, which may also be desired depending on the desired vehicle dynamic behavior.

Figure 11:
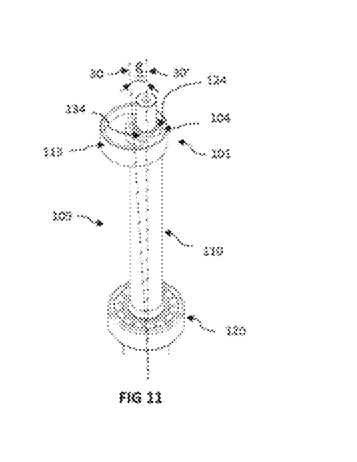
FIG. 11 shows a perspective side view of the steering column internal device, the rolling bearings of which are not coaxial to each other and have been taken out from the steering column, of a ninth variation of the invention.
Figure 11A:
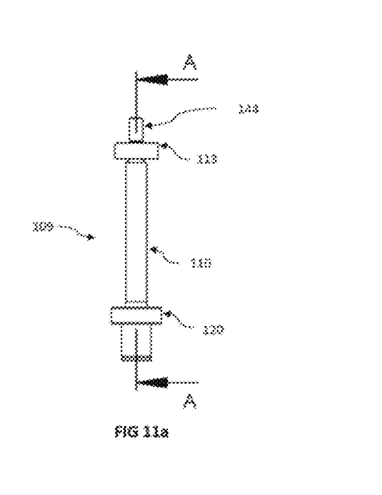
FIG. 11a shows a front view of FIG. 11
Figure 11B:
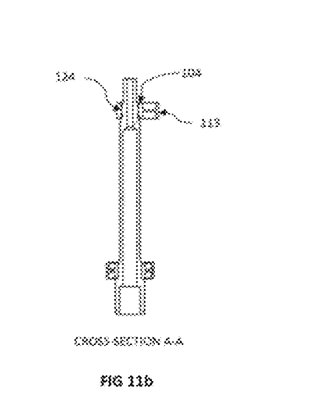
Figure 11C:
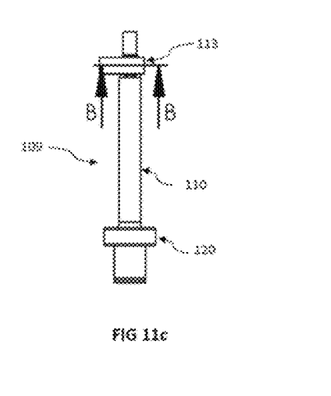
FIG. 11c shows a side view of FIG. 11
Figure 11D:
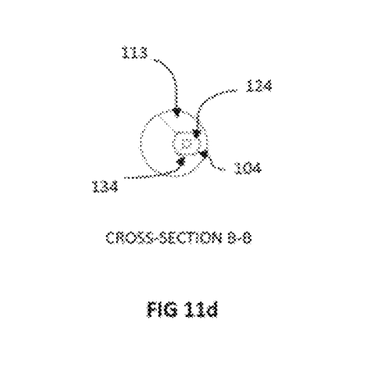
FIG. 11d shows a view according to cross-section B-B in FIG. 11c.

According to a ninth alternative of the invention, illustrated in FIGS. 11 to 11d, the steering column internal device (109) comprises a shaft of the steering column (110) provided at one end in a concentric spherical member (120) and at the second end thereof in an opening (104) provided eccentrically in the inner ring (113) of a concentric rolling bearing (101) whose external members are not illustrated.

When the two rolling bearing members (101, 120) are provided coaxially in the steering column, the normal guiding axis of the steering column forms with the steering column shaft (110) an angle (ß), represented by the axes (30, 30').

A spherical joint (124) provided on the steering column shaft (110) is positioned in the opening (104) and comprises at least one flat mating surface (134) (in French "méplat") allowing the steering column shaft (110) to pivot integrally with the inner ring (113) over its rotation around the axis (30).

A sleeve (not illustrated) is preferably fixed to the upper part (144) of the steering column shaft (110) so as to make possible to mount it onto the vehicle and to easily adapt to different steering column models.

When the steering column shaft (110) is in a position for driving in a straight-line, the angle (ß) has no influence on the transverse alignment of the front wheel with the rear wheel of the vehicle. When the steering column shaft (110) pivots to steer right or left, the angle (ß) transversely offsets the front wheel with respect to the rear wheel of the vehicle, thereby creating the shift (98) as previously described and induces the desired "warping" or spinning movement to improve the vehicle handling.

According to several implementation alternatives of the invention, the following changes and/or additions may be made to the previously described embodiments:

- Each fixed or spherical rolling bearing member (1, 31, 41, 51, 61, 71, 91, 101, 120, 320, 420, 520, 620, 720, 920) can be made as a ball bearing, roller bearings, needle bearings, bearing or any other similar means.
- Each spherical member can be formed by a concentric spherical rolling bearing or any other mechanism type allowing rotating and pivoting the steering column shaft (10, 110, 510, 610).
- The opening (4) can be of any shape such as, for example, round, square, rectangular, oval or according to any geometric profile.
- When the opening (4) is round, its hold integral with the eccentric spherical rolling bearing (1) can be obtained with a key or any other mechanical means.
- The rolling bearing members preferably have an outer diameter of less than 80 mm.
- The opening (4) preferably has a cross-sectional area greater than 1 cm$^2$.
- The thickness of the rolling bearing members is preferably greater than 5 mm.
- The distance between the upper and lower rolling bearing members of the steering column shaft is preferably greater than 50 mm.
- The axis eccentricity (14), distance (15), or distance (1930) between the rotation axis of the rolling bearing members (1, 31, 41, 51, 61, 71, 101, 320, 420, 520, 620, 720) and the relative position of the opening (4, 84, 104) accommodating all or part of the steering column shaft (10, 110, 510, 710, 1910) is preferably greater than 2 mm.

In a alternative, not shown, the steering column shaft or one of its parts can be made so as to form a part of the inner ring (3, 83, 113) of at least one of the previously described rolling bearing members. In this case, the steering column shaft is no longer detachable from the opening (4, 84, 104) which may prove useful for reducing production costs or producing special steering column mechanisms.

In another alternative, not shown, all or part of the steering column shaft can have any type of cross-section, round, oval, square, rectangular or according to any geometric profile.

In another alternative not shown, the steering column shaft can be made in

Although the invention is described according to several embodiments, there are other alternatives which are not presented and which can also be combinations or part of the previously described alternatives. The scope of the invention is therefore not limited to the embodiments described above.

What is claimed is:

1. A steering column internal device intended for dealigning a rotating front wheel of a vehicle comprising a steering column comprising a steering column shaft of which at least a part is provided eccentrically, and/or optionally obliquely, in relation or integral with at least one rolling bearing member wherein a steering column guiding axis leans or shifts transversely/laterally upon rotation of the steering column shaft, a transverse/lateral displacement of the steering column guiding axis of the steering column generates a shift of the rotating front wheel with respect to a rear wheel of the vehicle.

2. The steering column internal device according to claim 1 wherein the at least one rolling bearing member includes an eccentric spherical member fixed to an upper part of the steering column.

3. The steering column internal device according to claim 1 wherein the at least one rolling bearing member includes an eccentric spherical member fixed to a lower part of the steering column.

4. The steering column internal device according to claim 1 wherein the at least one rolling bearing member includes an eccentric rolling bearing member fixed to an upper part of the steering column.

5. The steering column internal device according to claim 1 wherein the at least one rolling bearing member includes an eccentric rolling bearing member fixed to a lower part of the steering column.

6. The steering column internal device according to claim 1 wherein a part of the steering column shaft is provided obliquely in the at least one rolling bearing member, wherein the at least one rolling bearing member is a concentric rolling bearing member.

7. The steering column internal device according to claim 1 wherein a part of the steering column shaft is provided obliquely in the at least one rolling bearing member, wherein the at least one rolling bearing member is an eccentric rolling bearing member.

8. The steering column internal device according to claim 7 wherein an opening of the at least one rolling bearing member has a cross-sectional area greater than 1 $cm^2$.

9. The steering column internal device according to claim 1 wherein the at least one rolling bearing member includes an eccentric and/or oblique rolling bearing member comprising an opening on the inner ring.

10. The steering column internal device according to claim 9 wherein the opening is circular.

11. The steering column internal device according to claim 9 wherein the steering column shaft is integrally held by a key structure in the opening.

12. The steering column internal device according to claim 9 wherein the steering column shaft is integrally held by a flat mating surface in the opening.

13. The steering column internal device according to claim 1 wherein the at least one rolling bearing members has an outer diameter of less than 80 mm.

14. The steering column internal device according to claim 1 wherein a thickness of the at least one rolling bearing members is greater than 5 mm.

15. The steering column internal device according to claim 1 wherein the at least one rolling bearing member includes an upper rolling bearing member and a lower rolling bearing member, and a distance between the upper and lower rolling bearing members of the steering column shaft is greater than 50 mm.

16. The steering column internal device according to claim 1 wherein an axis eccentricity or distance between the rotation axis of the at least one rolling bearing members and the relative position of an opening of the at least one rolling bearing member is greater than 2 mm.

17. The steering column internal device according to claim 1 wherein the shift is between 0 and 20 mm.

* * * * *